US008972266B2

(12) United States Patent
Bezar (10) Patent No.: US 8,972,266 B2
(45) Date of Patent: Mar. 3, 2015

(54) USER INTENT ANALYSIS EXTENT OF SPEAKER INTENT ANALYSIS SYSTEM

(76) Inventor: David Bezar, Mission Viejo, CA (US)

(*) Notice: Subject to any disclaimer, the term of this patent is extended or adjusted under 35 U.S.C. 154(b) by 289 days.

(21) Appl. No.: 13/494,771

(22) Filed: Jun. 12, 2012

(65) Prior Publication Data

US 2012/0262296 A1 Oct. 18, 2012

Related U.S. Application Data

(63) Continuation-in-part of application No. 12/925,618, filed on Oct. 25, 2010, now Pat. No. 8,200,494, which is a continuation of application No. 10/370,440, filed on Feb. 20, 2003, now Pat. No. 7,822,611.

(60) Provisional application No. 60/425,495, filed on Nov. 12, 2002.

(51) Int. Cl.
*G10L 21/00* (2013.01)

(52) U.S. Cl.
USPC ............................ 704/273; 704/250; 704/272

(58) Field of Classification Search
USPC ......... 704/246, 273, 270, 231, 247, 251, 255, 704/257, 272, 250; 434/350
See application file for complete search history.

(56) References Cited

U.S. PATENT DOCUMENTS

| 5,823,788 | A  | * | 10/1998 | Lemelson et al. ............ 434/350 |
| 6,219,640 | B1 | * | 4/2001  | Basu et al. .................... 704/246 |
| 6,523,008 | B1 | * | 2/2003  | Avrunin et al. ............... 704/273 |

* cited by examiner

*Primary Examiner* — Huyen X. Vo
(74) *Attorney, Agent, or Firm* — David G. Duckworth; Russo & Duckworth, LLP (57) ABSTRACT

A speaker intent analysis system and method for validating the truthfulness and intent of a plurality of participants' responses to questions. A computer stores, retrieves, and transmits a series of questions to be answered audibly by participants. The participants' answers are received by a data processor. The data processor analyzes and records the participants' speech parameters for determining the likelihood of dishonesty. In addition to analyzing participants' speech parameters for distinguishing stress or other abnormality, the processor may be equipped with voice recognition software to screen responses that while not dishonest, are indicative of possible malfeasance on the part of the participants. Once the responses are analyzed, the processor produces an output that is indicative of the participant's credibility. The output may be sent to proper parties and/or devices such as a web page, computer, e-mail, PDA, pager, database, report, etc. for appropriate action.

8 Claims, 6 Drawing Sheets

USER INTENT ANALYSIS EXTENT OF SPEAKER INTENT ANALYSIS SYSTEM

RELATED APPLICATIONS

This application is a continuation-in-part of my U.S. patent application Ser. No. 12/925,618, filed on Oct. 25, 2010, now U.S. Pat. No. 8,200,494, issued on Jun. 12, 2012, which in turn is a continuation of U.S. patent application Ser. No. 10/370,440, filed on Feb. 20, 2003, now U.S. Pat. No. 7,822,611, issued on Oct. 26, 2010, which in turn is a continuation-in-part of my U.S. Provisional Application Ser. No. 60/425,495, filed on Nov. 12, 2002.

BACKGROUND

The present invention relates generally to information processing and more particularly to an automated system of security whereby participants submit a voice sample for an analysis of the participant's truthfulness, credibility, intention or general deception.

The extension of the invention relates generally to information processing and more particularly to an automated system of security whereby participants submit a voice sample for analysis to determine if the participant has multiple identities for the purpose of committing fraud.

The extension of the invention also relates generally to information procession and more particularly to an automated system of security whereby participants submit the face in the form of a picture and also in the form of video to determine if the participant has multiple identities. The video of the participant's facial expressions (Also called micro expressions) is also used for analysis of the participant's truthfulness, credibility, intention or general deception.

There are numerous technologies wherein computers analyze or make use of human speech. For example, speech recognition software exists which will convert an oral message into a text format through speech-to-text software or by correlating the speech parameters of an oral message with "reference" speech parameters in order to interpret a participant's oral response.

There are also in existence several systems for computerizing the entire voice process. Both mechanical and electronic systems have been successfully employed in the design of computer voices. Computer hardware known as "voice platforms" or "text-to-speech engines" are well known in the art. For example, automated voice messaging systems, such as described in U.S. Pat. Nos. 6,487,533 and 6,483,899, retrieve a text message and automatically generate a language identifier corresponding to the text message. The text message is converted into computer-generated speech in a language corresponding to the language identifier. The systems then store or receive oral messages and convert the oral message to a text message using speech recognition software, and transmit the text message to an intended recipient. The oral message may also be sent as an attachment to the message.

Further, Interactive Voice Response (also known as IVR) is a mature technology that has been used for decades. Its primary functions have been to collect information from telephone callers, process that information and supply information to the caller. Over the years, Interactive Voice Response has developed into a highly productive tool that automates many processes that would otherwise require the time and expense of human beings to complete the task.

For example, Interactive Voice Response has been used extensively by businesses to answer consumers' questions, such as a bank providing account information using a computer over the telephone. Interactive Voice Response also includes telemarketing systems that are becoming more and more prevalent in society. These systems include a database of stored messages which are transmitted to homes across the country. The messages include advertisements and notices which can automatically provide information to 10s of thousands of listeners at a time. Similarly, automated response engines are used by companies to answer questions and provide information to callers. More complicated automated response engines are capable of asking questions and automatically recording responses. The caller responses may be provided by voice articulation, or formed by callers pressing buttons on the telephone to select various prerecorded responses combined with information that may be retrieved from some other database system based on the user's request and their account information.

Video Conferencing has also been around for decades. In recent years the technology has become mainstream; so much so that millions of people can now video conference, also called video chat, over the internet using their personal computers. Millions more can video conference directly from their mobile phone.

There has not been a system to determine the truthfulness, credibility, or intent of multiple callers simultaneously that can also leverage the capabilities of an Interactive Voice Response system or other multiple simultaneous audio or video input devices, such as Voice Over Internet Protocol (VOIP), Session Initiated Protocol (SIP), wireless networks such as 80211.a, 80211.b, 80211.g, 80211.x, open air, to PDAs or other wireless device, Satellite, 3G, 4G, GSM, CDMA, TDMA, Cellular, etc. Nor has there been a system that can automate the information gathering process for truthfulness, credibility or intent of multiple callers. Nor has there ever been a system that can compare and multiple callers to one another to determine which one of the callers is the most credible and which of those callers are the highest risk individuals. Callers have simply provided information without any analysis as to whether the information is credible or whether the information is being submitted for dishonest purposes. As a first example, it would be advantageous if a bank could automatically detect the credibility of persons accessing bank records as a criteria for determining whether the person is authorized to access the records. Speaker intent systems could also be used by the bank as part of their criteria to determine whether the person is performing authorized bank transactions, or to determine whether the caller should be subjected to additional checks and balances before completing the transaction.

Another example might be in the initial opening of an insurance claim to identify the overall honesty or fraud risk or that particular applicant/claim.

As an additional example, Interactive Voice Response systems are sometimes used to transact sales of products over the phone. Currently, such systems do not provide any analysis as to whether the buyer is authorized to use billing information, such as a credit card. More simply, though these automated systems are capable of providing information and soliciting information from a great number of callers at one time, these systems do not assess the credibility of callers or screen callers as to the truthfulness or intent of their responses, nor do they combine this information with other known pieces of information available from either an IVR or other data process device in an automated fashion in order to create even higher accuracies in their assessment.

Human speech is generated by the vocal cords and by turbulence as expelled air moves through the vocal tract creating a resonance of the cavities in the head, the throat, the lungs, the mouth, the nose, and the sinus cavities. Previous experiments show three types of voice-change as a result of stress. The first of these usually manifests itself in audible perceptible changes in speaking rate, volume, voice tremor, spacing between syllables, and fundamental pitch or frequency of the voice. The second type of voice change is not discernible to the human ear, but is an apparently unconscious manifestation of the slight tensing of the vocal cords under even minor stress, resulting in a dampening of selected frequency variations. When graphically portrayed, the difference is readily discernible between unstressed or normal vocalization and vocalization under mild stress, attempts to deceive, or adverse attitudes. These patterns have held true over a wide range of human voices of both sexes, at various ages, and under various situational conditions. The third is an infrasonic, or subsonic, frequency modulation which is present, in some degree, in both the vocal cord sounds and in the formant sounds. This signal is typically between 8 and 12 Hz. Accordingly, it is not audible to the human ear. Due to the fact that this characteristic constitutes frequency modulation, as distinguished from amplitude modulation, it is not directly discernible on time-base/amplitude chart recordings. However, this infrasonic signal is one of the more significant voice indicators of psychological stress. In addition, some voice based lie detection applications of current invention also employ artificial intelligence and neural networks to get an emotional reading of the person's intent.

There are in existence systems for recognizing emotions in speech. Thereby, numerous methods such as, neural networks and ensembles of classifiers, are utilized. For example, a voice authentication algorithm utilizing a neural network voice authentication algorithm is described in U.S. Pat. No. 5,461,697. Meanwhile, classifiers use pitch and linear predictive coding (LPC) parameters (and usually other excitation information too) for analyzing or encoding human speech signals is described in U.S. Pat. Nos. 6,427,137 and 6,463,415.

Many particular methods of voice analysis can be selected within the general framework of LPC modeling. For example, pitch or a format frequency are common analytes, which correspond to resonances of the vocal tract, which in turn corresponds to the frequency at which the larynx modulates the air stream.

Alternatively, U.S. Pat. No. 4,093,821 describes an approach wherein formant frequency distribution patterns are analyzed to produce a first output indicative of the nulls in the FM demodulated signal, a second output representing the duration of the nulls, and a third output proportional to the ratio of the total duration of nulls during a word period to the total length of the word period. The ratio is used to discriminate between theatrical emphasis and stress.

Commercial vendors of voice stress analyzers in the United States include, but are not limited to: The National Institute for Truth Verification, CCS International, Diogenes Group, Risk Technologies, and Nemesysco, as well as, Makh-Shevet in Israel. Other names used to refer to voice stress analysis (VSA) include but are not limited to: CVSA—Computerized Voice Stress Analyzer (analysis), Lie detector, Truth Detector, Narrative Analysis, emotional analysis, psychological analysis, psychological stress evaluation (PSE), Rich Psychological Analysis, Credibility Assessment.

Commercial vendors of face recognition and emotion-recognition software (also referred to facial expression software) include, but are not limited to: Google, Paul Ekman Group, LLC., Luxand, Inc., Faculty of Science, University of Amsterdam, and others.

The disadvantage of the known approaches to voice credibility assessment is that large-volume applications are presently impractical and not economical. For example, known approaches require personnel to operate the systems on a one-to-one basis and/or these systems cannot process large volumes of voice samples or simultaneous voice samples. In addition, specialized equipment and software must be installed at the local computer for each person performing analysis.

The disadvantage of the known approached to facial emotion-recognition software is that it relies solely on the facial analysis and has no means of corroborating the results provided by the software. In addition, the results are not compared to other emotional-recognitions to determine the most credible and the highest risk individuals within a group.

Thus, there is a need for a speaker intent, user intent and credibility solution that is automated, and is capable of recording and analyzing the responses of persons located anywhere around the globe where a communications link can be established. It would further be desirable for an automated system that was capable of simultaneously analyzing the responses of numerous persons at one time. Additionally, it would desirable if the automated system could be applied to various applications in a variety of fields, such as: insurance, unemployment, disability, welfare, homeland security, parole management, call centers and customer relationship management, security in general, banking, legal, credit card fraud, general fraud prevention, employment screening, sales priority assessment, predictive analysis, marketing research, etc. In addition, dynamic prompts could be generated from any business process based on the real-time analysis of person/speaker. For example, a questionable answer would cause the system to prompt for further detail or solicit more information about the suspect response.

SUMMARY OF THE INVENTION

The invention relates to a speaker intent analysis system capable of communicating with a plurality of persons simultaneously. In the most general of terms, the speaker intent analysis system includes a first "inquiry" transceiver for transmitting questions to participants to elicit human participants' facial and verbal responses, and for receiving the participants' responses. The user/speaker intent analysis system further includes at least one second transceiver for permitting participants to receive and respond to the questions, and for transmitting the participants' verbal and/or video response back to the first transceiver. Preferably, the user/speech intent analysis system includes many transceivers for allowing a plurality of participants to concurrently receive and respond to questions, make requests and/or process video and dialogue.

Of importance to the practice of the invention, the user/speaker intent analysis system further includes a computer processor in communication with the transceivers for receiving the responses of multiple participants. In response to questions, the participant responds with a verbal and/or video answer/response which is transmitted by the participant's transmitter through to the processor. The processor receives the participant's response, submits the response for analysis when appropriate and analyzes one or more speech and/or facial parameters by applying any of numerous speech stress methodologies and emotional-recognition methodologies to distinguish whether the speech parameter indicates a high or low probability of credibility/truthfulness. Thereafter, the processor produces output signals which include objective factual data, scientific analysis and potentially artificial intelligence and/or neural network analysis information that indicates whether the participant's response indicates the person's/speaker's intent and a scaled high to low probability of credibility, truthfulness and potentially identifying risk factors. The processor may analyze the response in "real time" thereby eliminating the need for recording the participant's response. However, preferably, the user/speaker intent analysis system of the present invention includes a memory for storing the video and audio responses and retrieval for later review or analysis. Automated comparisons between multiple sessions can also be achieved.

Preferably, the processor is connected to a database permitting the processor to automatically retrieve questions from the database and transmit the questions using a first transceiver to the participant's transceiver. These questions can be static or the question and answer session may be dynamic based on the "real-time" analysis of previous responses.

Also preferable, the system's first transmitter and first receiver are preferably, but not necessarily, coincidentally located. For example, in a preferred embodiment of the invention, the first transmitter and first receiver are provided in the form of a video and/or voice processing hardware and software, which can support multiple transmitters and receivers, and that has the ability to speak and record which is connected to the computer processor. The video and/or voice processing board is also connected to a communications link for transmitting video and/or voice questions to a human participant(s). A communications link is defined as any communications medium capable of recording or transmitting video and/or audio, including but not limited to: The Public Switched Telephone Network (PSTN), The Internet, Intranets, Voice Over Internet Protocol (VOIP), Session Initiated Protocol (SIP), H.323, H.320, H.324M (3G-324M), H.264, H.239, G.722, T.120, wireless networks such as 80211.a, 80211.b, 80211.x, Satellite, GSM, CDMA, TDMA, Cellular, radio, television, etc. Meanwhile, the participants' second transceivers are preferably provided in the form of traditional voice telephones or other voice input devices such as wireless telephones, PDA or pre-recorded responses collected by other means. Video sources could be such forms as Television cameras, Video conferencing systems, Web cams, and wireless phones with built in cameras and others.

The invention provides a fully automated computerized system capable of automatically retrieving questions stored on the memory medium. The credibility assessing system automatically transmits questions over a communications network to a participant, and automatically receives and analyzes the participant's responses to the questions. The processor produces output signals which include objective factual data and scientific analysis information that indicate whether the participant's response indicates the person's/speaker's intent and a high or low probability of accuracy and credibility.

Additionally, the computerized system may also automatically recognize a participant's directed response to a question by a voice-recognition process, and/or the system may automatically output an alert if the participant's responses meet a certain criteria. Furthermore, the credibility assessing system may use voice print identification recognition technology to automatically recognize the identity of a participant for providing an alert.

Additionally, the computerized system may also automatically use the voice print that was captured to determine of that voice print also matches the identity of other persons/accounts within the computerized database. The computerized system, using the directed response voice prints compares each voice print identity to other potential matching voice prints with the objective of finding individuals that have multiple accounts, thus are attempting to have multiple identities and possibly perpetrate or participate in fraudulent activities.

Additionally, the computerized system may also automatically capture the face of the person for identification purposes. The computerized system with then use all data sources available to try to find other accounts/identities/persons that match that facial identification. The purpose of this automated computer process is to find individuals with multiple identities and are potentially using those identities to perpetrate or participate in fraudulent activities.

Preferably, the invention also provides a fully automated interactive system whereby a plurality of participants may be identified and questioned and analyzed at the same time. Additionally, the system may automatically output the product of the analysis, indicative of the probability that a participant has been truthful based on the participant's responses, to a plurality of interested parties and/or devices such as a web page, computer, e-mail, PDA, pager, database, report, etc. at one time.

The invention also provides a system whereby a participant activates the interactive program, resulting in the system performing an analysis of the participant's facial expressions and voice, and producing results relating to an analysis of the participant's response.

It is an object of this invention to provide a communications system for analyzing numerous persons' faces, facial expressions and voices for credibility, intent, risk and truthfulness.

It is also an object of this invention to provide an automated communications system for recording and analyzing human responses.

Finally, it is an object of this invention to provide a system for rapid and remote processing of facial expressions and voice analysis in vast quantity and with the least possible labor and expense.

DETAILED DESCRIPTION OF THE INVENTION

In most general terms, the present invention is directed to an interactive user and/or speaker intent analysis system. With reference to the figures, the speaker intent analysis system includes a plurality of transceivers 10, having both a receiver and a transmitter, for allowing participants to receive questions asked either by the automated system or asked by a human being being scripted by the system and verbally responding to such questions while possibly transmitting video of the person's face and facial expressions. The transceiver 10 could be any of the following devices including, but not limited to, a telephone, wireless phone, PDA, computer, video camera, web browser, recorder, etc. The transceivers may be constructed in various forms as can be determined by those skilled in the art. For example, the transceivers may be constructed as personal computers including voice cards or software that accomplishes the same objective. Alternatively, the transceivers may be traditional telephones or other communication devices known to those skilled in the art.

The user and/or speaker intent analysis system further includes at least one "inquiry" transceiver 30 for transmitting questions to the participants to elicit facial and/or verbal responses which are transmitted back to the inquiry receiver. The participant transceivers 10 and inquiry transceivers 30 are connected by a communications network 12. In a preferred embodiment, the participant transceivers are traditional video conference or telephones connected to the PSTN (Public System Telephone Network) or other communication links as defined above, which are known or capable of being produced by those skilled in the art.

Of importance to the practice of the invention, the speaker intent analysis system further includes a computer processor 14 in communication with the transceivers for transmitting questions and receiving the responses of the participants. In response to questions, the participant responds with a verbal answer which is transmitted by the participant's transmitter to the processor 14. The computer processor includes a voice processing platform which receives the participant's responses and analyzes one or more speech parameters by applying any of numerous speech stress methodologies to distinguish whether the speech parameter indicates a high or low probability of truthfulness. Thereafter, the processor produces output signals which include objective factual data and scientific analysis information that indicates whether the participant's response indicates the speaker's intent and a high or low probability of truthfulness also referred to as a risk factor. The processor may analyze the response in "real time" thereby eliminating the need for a permanent recording the participant's response. However, preferably, the speaker intent analysis system of the present invention includes a memory for storing the responses for later review or analysis.

The speaker intent analysis system of the present invention may include a typical computer hardware configuration of a workstation having a central processing unit, such as a microprocessor, and a number of other units interconnected via a system bus. The workstation includes memory, e.g. Random Access Memory (RAM) and/or Read Only Memory (ROM), a communications medium, an I/O adapter for connecting peripheral devices such as disk storage units to the bus, a user interface adapter for connecting a keyboard, a mouse, a speaker, and a microphone. The workstation may also include other user interface devices such as a touch screen (not shown) connected to the bus, communication adapter for connecting the workstation to a communication network (e.g., a telephone or transmission network) and a display adapter for connecting the bus to a display device. The workstation includes an operating system such as the Microsoft Windows XP, 2000, NT or Windows/95/98 Operating System (OS), the IBM OS/2 operating system, the MAC OS, Solaris, Lynux or UNIX operating system. Optionally, telephones, recording related devices, digital receivers, and amplifiers may also be connected to the bus.

Figure 1:
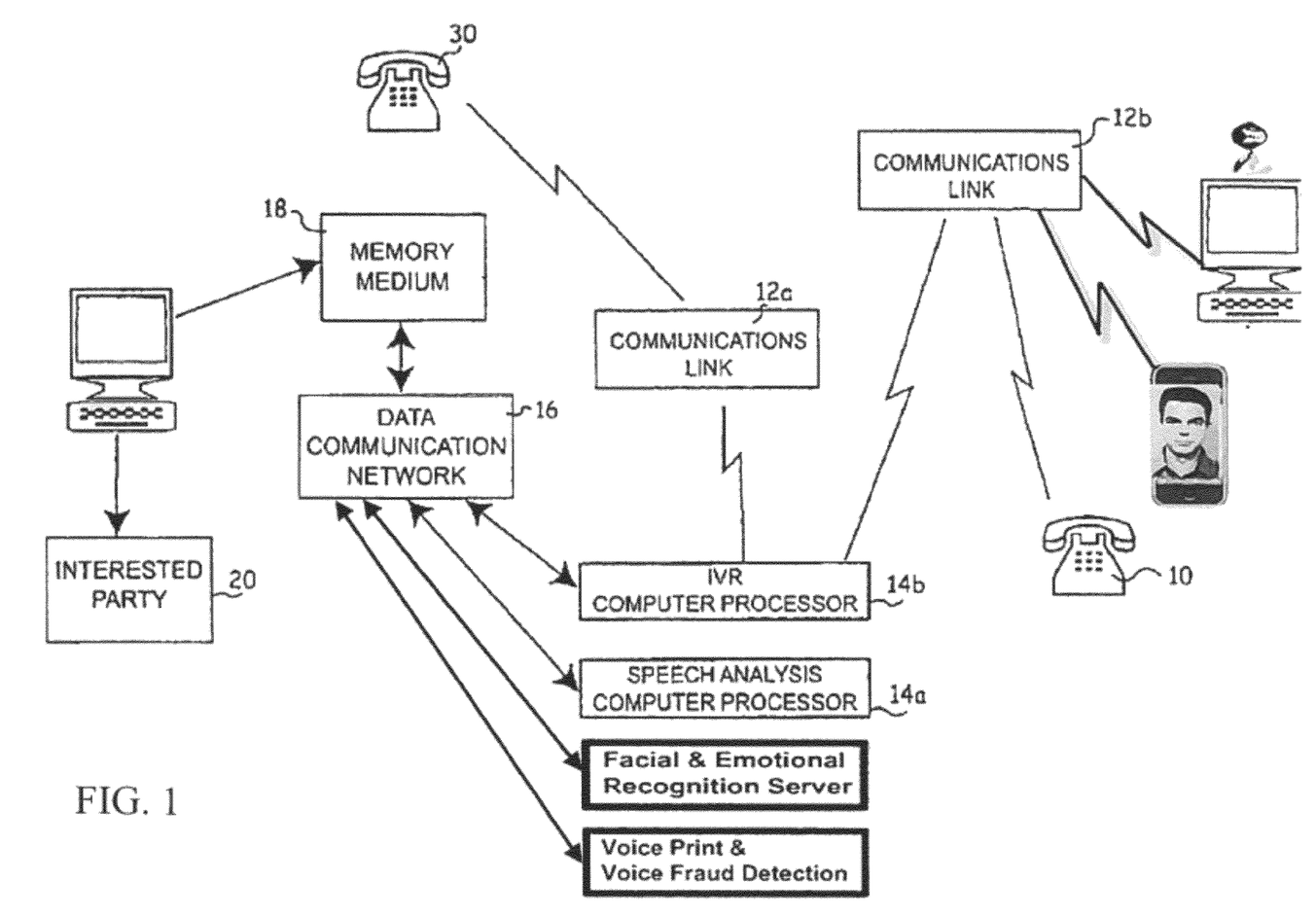
FIG. 1 is a flow chart illustrating the user and speaker intent analysis system of the present invention.

With reference to FIG. 1, in a first preferred embodiment, persons 30 verbally ask questions of participants 10 in order to receive verbal responses. The responses are communicated through the communications network 12 and received by a central processor 14. Various speech parameters are analyzed using methodologies known to those skilled in the art to determine the intent and truthfulness of the participant. Preferably, the many participants are connected to the central processor for simultaneously analyzing the responses of numerous persons at one time. Advantageously, the system can be scaled to perform the analysis of 10s, 100s, 1000s, or 10000s of participants' responses at one time.

More specifically, two or more participants 10 are connected to the central computer processor 14 via communications links 12a. The computer interface 14 includes a speech parameter analyzer 14a and in many cases includes an Interactive Voice Response ("IVR") computer processor 14b which functions as a source of computer-generated questions. The computer processor 14 further communicates over a data link 16, which forms part of the communications network 12, to a memory medium 18 for recording the participant's response and the product of the speech analysis. This information is now available for further analysis using conventional computer processing techniques.

Figure 3:
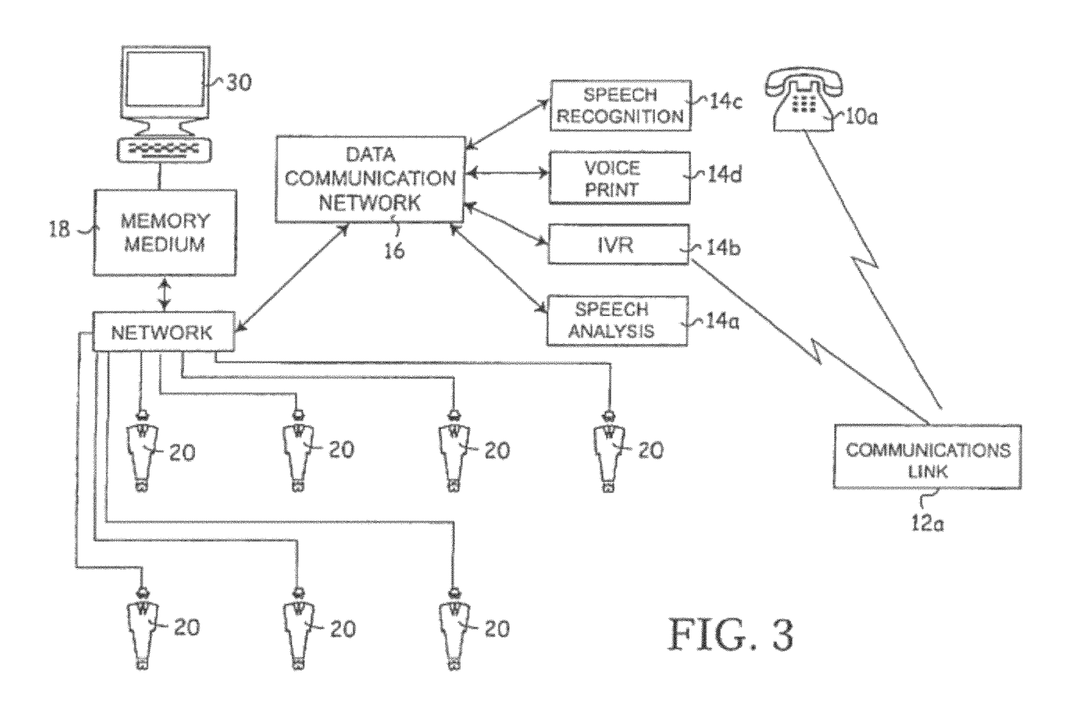
FIG. 3 is an illustration of the data flow from participants to the processor.

With reference to FIG. 3, in an additional preferred embodiment, the computer voice processor includes a database of questions which are automatically transmitted by the processor in response to predetermined events, such as a caller placing a call to initiate activation of the speaker intent analysis system. The computer voice processor receives and analyzes a participant's speech patterns with the object of detecting the probability of the participant's credibility, intent and truthfulness. As would be understood by those skilled in the art, the processor may include one or more computer processors which are located at one location, or may include multiple computer processors spread over great geographic distances.

Figure 2:
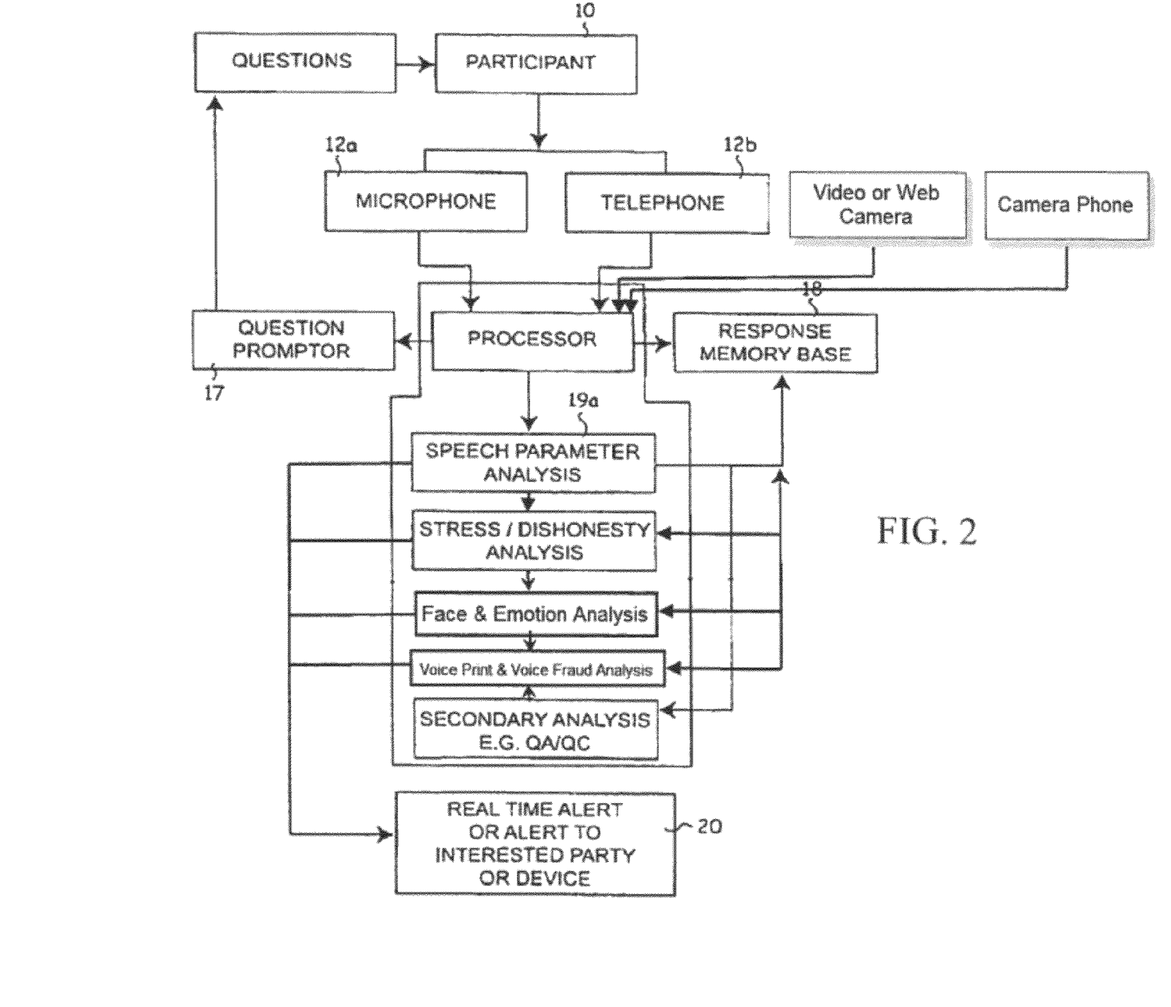
FIG. 2 is a flow chart illustrating the user and speaker intent analysis system of the present invention wherein the video and/or speech parameter analysis is shared between multiple servers.

With reference also to FIG. 2, the computer voice processor 14 stores predetermined questions within the computer's memory 17 which are selected and transmitted in audio or textual form to a participant. The messages are designed to elicit an audio response from the participant, which is then received by the processor for analysis. While the computer may generate and send messages electronically or digitally as either a computer-generated voice or text message, a participant's response is in the form of a speech transmission.

Still with reference to FIG. 2, responses flow from the participant 10 over the communications link 12a or 12b to the computer processor 14. The processor sends the original response to the memory medium 18 for recording and further analysis of the data. Once analyzed and interpreted, the data reflecting the participant's truthfulness and intent are also sent to the memory medium 18 for recording. Finally, an alert is generated if the data meets a certain criteria which are sent to an interested party or device 20.

The speaker intent analysis system of the present invention, and its individual components, may be constructed in various manners as can be determined without undue experimentation. Presented below are preferred examples of such constructions, though the invention is not intended to be limited to the examples provided.

Computer-Generated Messages

With reference to FIG. 2, in a preferred embodiment, the speaker intent analysis system of the present invention utilizes computer based communication to select stored questions and transmit such questions to human participants. There are numerous methods for computer-based communication, for example, text-to-speech engines, analog and digital recordings, etc. Alternatively, an array of digital file formats can be utilized to transmit an audible message stored in a database. Moreover, software programs for fully automated text-messages may also be used, particularly where participants are of various ethnic origins and likely to require language translation. Text messages may be more readily translated into the language of choice automatically.

Text-to-speech engines generally include a text analyzer, a syntax and context analyzer, and a synthesis module. The text analyzer, in conjunction with the syntax and context analyzer, utilizes a rule-based index to identify fundamental grammatical units within textual data. The fundamental grammatical units are typically word and/or phoneme-based, and the rule-based index is correspondingly referred to as a phoneme library. Those skilled in the art will understand that the phoneme library typically includes a word-based dictionary for the conversion of orthographic data into a phonemic representation. The synthesis module either assembles or generates speech sequences corresponding to the identified fundamental grammatical units, and plays the speech sequences to a listener.

Other systems, such as voice platforms may be used which preferably include a voice board, a network interface unit, a processing unit, a data storage unit, and a memory. Within the memory, a set of voice messaging application units; a message buffer; a plurality of text-to-speech engines and corresponding phoneme libraries; a trigraph analyzer; and a set of co-recurrence libraries may be stored and operational. Each voice messaging application unit comprises program instructions for providing voice messaging functions such as call answering, automated attendant, and message store/forward operations.

Another computerized voice communication system is described in U.S. Pat. No. 6,487,533 which is hereby incorporated herein by reference. This patent describes in significant detail a process whereby a computer automatically initiates automatic language identification operations, as well as, text-to-speech conversion performed in accordance with the results of the language identification operations.

Furthermore, preferably, the computer's database contains information for identifying potential participants. With reference to FIG. 3, the computer interface 14 and 14b preferably includes a voice recognition process 14c and/or caller identification system 14d. In particular, automatic server or number identification or a dialed number identification or user entry from over the telephone network may be used to determine the identity of the participant. The identity of the participant can then be used by the processor to select which series of questions will be used with a particular participant to ensure that the questions contain particular relevance or appropriateness with regards to the participant's activity. In this way, the computer-generated questions would not be random. Instead, the questions would collect valuable information that need to be collected, and the questions are also designed to elicit responses from participants to detect the participants' intent. Based on the responses received and the subsequent analysis results, additional questions and answers may be elicited.

Participant's Response Processing

The speaker intent analysis system's processor receives the participant's response via a communications link, for example, a telephone system, Internet, wireless phone, VOIP intercom, radio transmission, etc. Once received, the processor may analyze the participant's response in terms of speech parameters through various methods of analysis. As described above, the processor may include multiple connected processors or one discreet unit capable of communicating with a multitude of participants simultaneously.

The participant's communications system typically will include a telephone having a microphone and a speaker. Optionally, the participant's system may also include a computer screen or reading-platform where the computer-generated questions may be displayed in a text format. For example, the computer-generated questions may be accessed via internet or intranet at all hours of every day so that specific questions directed toward participants engaged in a particular activity may be communicated to participants all over the world. Other networks, for example a telephone system, conference calling, or an audio computer link, may broadcast questions to multiple participants and enable multiple analyses at the same time.

Figure 4:
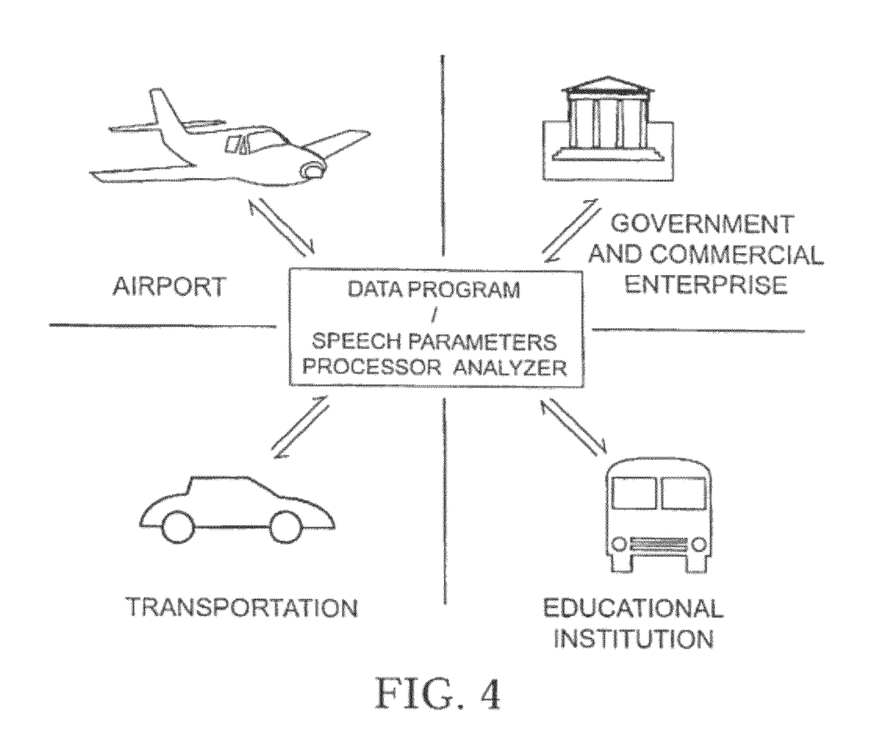
FIG. 4 is a flow chart illustrating the user or speaker intent analysis system process of the present invention.

With reference to FIG. 4, in another embodiment of the invention, the speaker intent analysis system can be used for several purposes at once. A plurality of participants 10a, 10b, 10c, and 10d are engaged in various activities where the credibility or sincerity of the participants is in question. In such cases, multiple interested parties utilize a single credibility assessing system to screen the credibility of a multitude of participants. Accordingly, the credibility assessing system may utilize and retrieve a particular series of questions from a database which stores several different series of questions. Each series is based upon the participant's activity and the interested party's particular concern.

Once received by the processor, the participant's response may be recorded or stored in the computer's memory for later play-back or additional analysis. Additionally, once the signal has been processed and analyzed, the products of the analysis may also be stored in the computer's memory for use at a later time.

Figure 5:
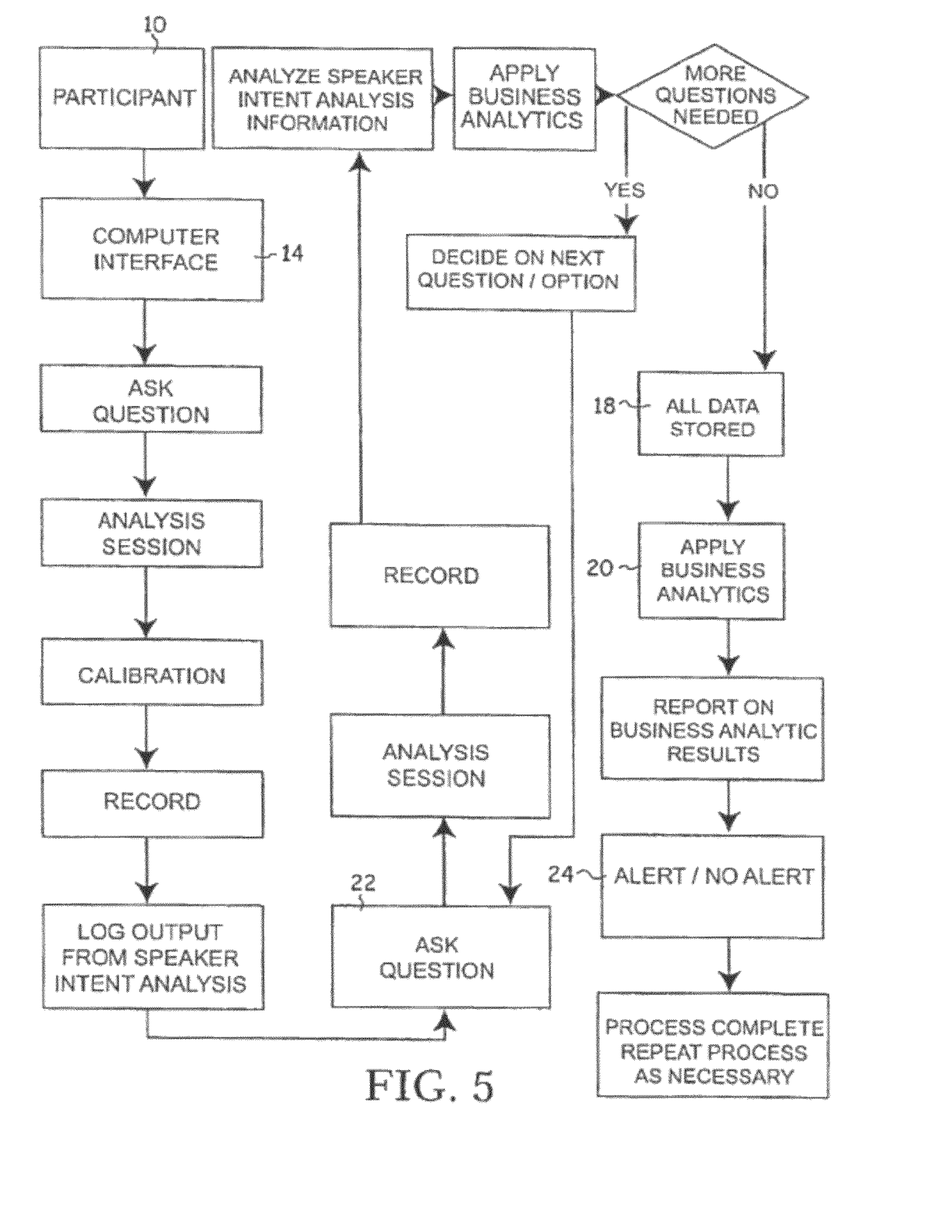
FIG. 5 is an illustration of the speaker intent analysis system of the present invention wherein the video and/or speech parameter analysis is conducted on multiple participants concurrently.

With reference to FIG. 5, in operation, the computer interface 14 answers a call from the participant 10. Based on the method of communications, i.e. the telephone number dialed or the IP address contacted, initial analysis and calibration steps are initiated to determine the questions to be asked the participant and also used to calibrate the voice for the speaker intent analysis process. This can be done by automatically asking standard questions of the participant, such as their account number, name, address, etc. Subsequent questions 22 are selected from the database and issued to the participant 10. As requests, questions and responses are received, they are stored in the memory medium 18 and potentially used to determine further courses of action on the fly. When no additional questions or requests are necessary, the final analysis data results are also stored in the memory medium 18 and potentially sent to interested parties 20. Based on an analysis of the participant's responses, an alert 24 is created if necessary.

Speaker Intent and Credibility Analysis

Of importance to the practice of the present invention, the credibility assessing system's processor applies methods of speech analysis to automatically access the credibility of the speaker's response. Examples of speech analysis methods are described below but do not encompass all of the possible speech parameter analysis for practicing the present invention. Moreover, several speech parameter analysis methods may be intermingled or combined to achieve a most efficient and confident system of analysis.

Figure 6:
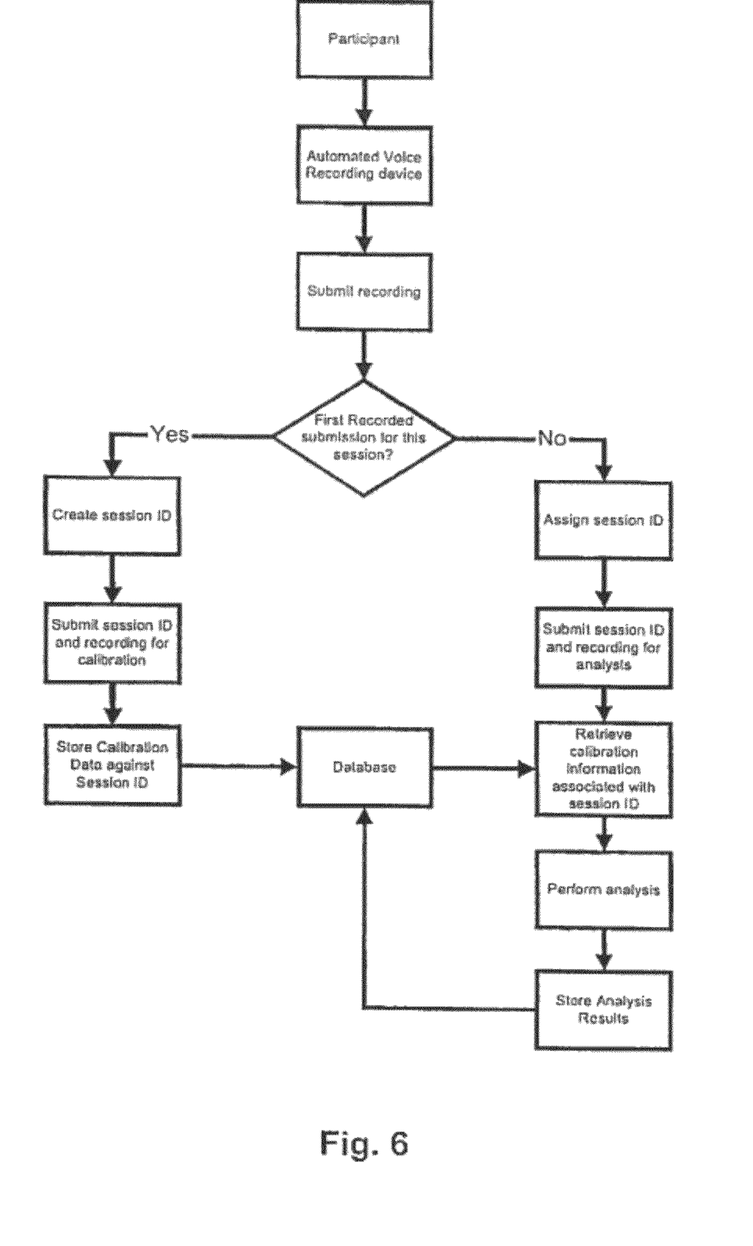
FIG. 6 is a flow chart illustrating the user and/or speaker intent analysis system for initial or multiple applications for a participant in a multi-threaded environment.

In a first embodiment, voice signals are received from a person, for example, via a telephone through an Interactive Voice Response system. The voice signals are analyzed to determine a level of stress, nervousness, irregularity, or other emotion common to a person when being deceitful as described above. Preferably, a degree of certainty as to the level of nervousness or irregularity of the person is provided to assist one searching for deceit in making a determination as to whether the person was speaking truthfully. This may be based on statistics of a series of baseline communications designed to gather a range of normal voice patterns for a particular person. With reference to FIG. 6, the baseline voice patterns may be used for immediate analysis of a participant's responses. Alternatively, the baseline voice patterns may be stored in a database for retrieval and comparison to a participant's responses provided at a later date.

Voice analysis includes extracting at least one feature of the voice signals, which is used to determine the level of nervousness or irregularity of a person. Examples of features that may be extracted include, but are not limited to: a maximum value of a fundamental frequency, a standard deviation of the fundamental frequency, a range of the fundamental frequency, a mean of the fundamental frequency, a mean of a bandwidth of a first formant, a mean of a bandwidth of a second formant, a standard deviation of energy, voice vibrato, a speaking rate, a slope of the fundamental frequency, a maximum value of the first formant, a maximum value of the energy, a range of the energy, a range of the second formant, and a range of the first formant.

As an option, after a set of voice features has been extracted, the computer processor analyzes some derivative features such as LPC (linear predictive coding) parameters of signal or features of the smoothed pitch contour and its derivatives. For example, fundamental parameters of a person's speech such as frequency, energy, speaking rate, duration and number of pauses, first three formants and their bandwidths may be calculated and considered. Then secondary features, such as, speaking rate can be calculated as the inverse of the average length of the voiced part of utterance. Most parameters may be statistically expressed as: mean, standard deviation, minimum, maximum and range, slope, linear regression, best fit line, proportions such as (voiced energy–the total energy of utterance), etc. There may be no limit to the various statistical calculations available to distinguish a base-line voice pattern to stress-affected voice patterns.

In one embodiment of a speaker intent analysis, a transducer converts the sound waves of the oral utterances of the participant into electrical signals wherefrom they are connected to the input of an audio receiver, e.g. an amplifier, which adjusts the power of electrical signals to a more stable, usable level. The audio receiver's output is connected to a filter for eliminating undesired frequency and noise components.

After potentially filtering the signal, the signal is sent to an FM discriminator where the frequency deviations from the center frequency are converted into signals which vary in amplitude. The amplitude varying signals are then detected in a detector circuit within the processor for the purpose of rectifying the signal and producing a signal which constitutes a series of half wave pulses. After detection, the signal is connected to an integrator circuit within the processor wherein the signal is integrated to the desired degree. In circuit, the signal is either integrated to a very small extent, producing a wave form, or is integrated to a greater degree, producing a signal. After integration, the signal is amplified in an amplifier and connected to a processor which determines the emotion associated with the voice signal. An output device such as a computer screen or printer is used to display the detected emotion. Optionally, statistical data may be produced as well.

In another embodiment of the present invention, voice analysis includes transmitting the participant's response to the processor as an electronic signal from, for example, a transducer or recorder via an input port. An operational amplifier with gain and performance determining resistors can isolate and provide linear amplification of the input signal. This isolated and/or amplified signal may then be directed by a processor or diode to specialized circuitry for analyzing and comparing, differentiating, and/or rectifying (by way of filters, for example) occurrences within the input signal such as nulls, voltages, and gate, frequency, voice vibrato, and many other speech parameters.

In still an additional embodiment of the present invention, the credibility assessing system detects emotion using statistics. The database includes probabilities of particular voice features being associated with an emotion. Preferably, the selection of the emotion from the database includes analyzing the probabilities and selecting the most probable emotion based on the probabilities. For example, credibility may be indicated as a function of stress, nervousness, fear or anger, for example, and so credibility may be assessed through an analysis of many choices of emotions.

Lastly, data that is collected which represents voice patterns may be enhanced by, for example, normalization processes, to more readily discern distinct features of the voice pattern. One skilled in the art of statistical analysis is knowledgeable enough to identify the advantages and disadvantages of various statistical test methods.

By this method, preliminary responses to questions provide a base-line or standard for which subsequent questions can be compared. In effect, preliminary responses provide a range of normal speech parameters for calibrating the credibility assessment system to a particular participant's voice.

In some instances, a participant with bad intent may anticipate the purpose of such a processor as detecting truthfulness or credibility. In such cases, the participant may answer truthfully to questions with the interest of passing through the security measure without being detected for their bad intent. For this reason, the processor must also be equipped with voice recognition to identify responses that indicate malfeasance without indicating dishonesty or untruthfulness.

In such cases, the participant will orally speak the response to be received by the processor which contains speech recognition software. The speech recognition software may identify responses that indicate a potential harm or threat that may/or may not be perceived by the speech parameter analysis for truthfulness.

Modes of Operation

As is readily understood by one skilled in the art, the speaker intent assessing system can optionally incorporate a limitless arrangement of various computer-generating messaging systems and participant response processing systems.

In addition to the system components, however, the speaker intent analysis system may be employed in either a passive, interactive, or automatic modes of operation. In the passive or automated modes of operation, the participant and the questioner need not know that the credibility assessing system is in operation. In this case, the speaker intent assessing system is a seamless addition to the communications network. In such a case, the database containing questions and the processor for analyzing the responses may be integrated into the communications network or may be separate units only receiving signals from the questioner and/or the responder. This type of system may particularly be of benefit to government or law enforcement agencies where security is a priority.

In the interactive mode of operation, communication may already be in progress through the speaker intent analysis system when a party decides to engage the speaker intent assessing system. In such a case, the communication link may route the communication to the speaker intent analysis system interface, or it may be added in remotely via a conference bridge, or the recorded speech could be analyzed at a later time. The advantage of this system is the option to engage the speaker intent analysis system at will and only during periods of communications that are of interest for analysis. Interested parties, such as insurance companies, would be greatly assisted if in the event of a claim, the claimant could be screened for credibility at the time of reporting a loss.

In the automatic mode of operation, which is the preferred embodiment of the invention, the speaker intent analysis system is fully automated wherein every communication on a given communications network engages the credibility assessing system interface. In the "automatic" mode, the system asks the questions, obtains the verbal response and processes the response using the voice based lie detector technology in an automated fashion. The results from the lie detector technology are then passed on for further analysis that combines the lie detector information with other known information to determine a speaker's intent and credibility. Responses are analyzed individually and as a whole.

A telephone or the like is designated as a terminal for screening participants. This terminal may include a speaker or a computer screen for emitting questions and a microphone for receiving participants' responses. Furthermore, this terminal may be located in any convenient setting, such as one's home, airport terminals, bus and train depots, mail service depots, entrances into secured buildings, entrances into special ceremonies or events, or even a lender's or employee-services' office. Calls and questions can be initiated through an Interactive Voice Response (IVR) platform. Responses are then pooled at a single processing system having high line density voice processing boards for permitting the analysis of hundreds or thousands of calls at the same time.

Where appropriate, after the speaker intent analysis system analyzes a response, the computer produces an output signal that indicates potential harm or threat that may be transmitted to proper authorities or interested parties for immediate action.

EXAMPLE 1

The present invention has almost unlimited uses. For example, in a first practice of the invention, the speaker intent analysis system is used to screen persons applying for life insurance. To this end, a person calling the insurance company on the phone is fed a series of computer produced questions to calibrate the person's voice for credibility assessment. The preliminary questions may include, for example, a request for a person's name, address, phone number, billing information, and the nature of their call. Thereafter, the computer uses speech recognition software to determine the nature of the call and selects a series of questions from its database relating to the caller's inquiry or based upon the embodied design of that application. For example an inquiry for life insurance might result in the computer selecting questions relating to the caller's age, sex, health, smoking and drinking habits, etc.

The speaker intent analysis system's computer collects the answers and then processes them for analysis. The system then determines the credibility of the applicant's responses individually, grouped and combined. Each response would have its own score and weight. A grouped or combined output may conclude that the applicant has a score of 674 of a possible 1000 of being truthful about their health history, in general. Depending on the credibility analysis being performed, the score of 674 may be high, low or moderate concern for deception. Additionally, the computer processor preferably provides a credibility assessment as to answers to specific questions. For example, the computer may determine that the person was truthful when stating they had never experienced a stroke. However, the computer may issue an alert indicating that there is a high likelihood that the person is being untruthful regarding the age that his parents became deceased.

The participant's responses, and the credibility of his responses, are then considered by a person, or by the computer, in providing the participant with an insurance quote. For example, the insurance company, using the computer, may simply increase the caller's premium by an established percentage if his credibility is at risk.

EXAMPLE 2

As a second example, the speaker intent analysis system is used to collect and assess worker's compensation claims for job-related injuries. Typically, the claimant must report periodically over the phone to the insurance company as to the status of his injury and status of the efforts for rehabilitation, including identifying his recent visits to doctors and therapists. To this end, the claimant calls a phone number which directs his call so as to be controlled by a computer. A series of questions are asked. These questions may include preliminary questions so as to provide a baseline, or calibration of the claimant's voice. For example, these questions may include: (1) the cause of the injury; (2) whether the injury still exists; (3) whether the claimant is able to work; (4) whether the claimant has collected any unreported income or income from another source; and (5) whether the claimant has worked during the period of collecting worker's compensation. The voice patterns may be used for immediate analysis to determine the intent and truthfulness of a participant's responses. Alternatively, the baseline voice patterns may be stored in a database for retrieval and comparison to participant responses provided at a later date.

With reference to FIG. 6, as an example, during a participant's first telephone call, a participant is asked a series of calibrations questions. The participant's responses provide calibration data for storage in a central database. For an initial 11 weeks, each answer submitted by the claimant is compared against the calibration data and the results of the analysis indicates participant truthfulness. Upon the $12^{th}$ week, however, the claimant's answers are compared against the calibration data and the analysis indicates deceit or untruthfulness. In particular, the analysis might indicate that the participant was untruthful about their ability to work and that they have income from another source. This information, useful to the insurance company, may be used as an additional criteria to be considered when determining whether to initiate an interview, evaluation, or checkup of the claimant.

EXAMPLE 3

Insurance Claims—

As an additional example of the speaker intent analysis system of the present invention. An insured patron calls to report a claim and engages the speaker intent analysis system (S.I.A.S.) in automatic mode. An automatically initiated conversation may proceed as follows:
S.I.A.S.: Please state your name and policy number.
patron: John Doe, Number 9872357.
S.I.A.S.: Are you calling to report a claim?
patron: yes
S.I.A.S.: Are you medically injured?
patron: yes S.I.A.S.: Please state the extent of your injuries known to you at this time.
patron: I have a fractured right arm and bruising on the right side of my body.
S.I.A.S.: Does this claim regard damage to a vehicle, residence, or other? If so, please specify any identifying characteristics such as injury, or make and model, VIN number, or complete address of the residence.
patron: Vehicle, Honda Prelude, 1995, VIN Number WU62343198.
S.I.A.S.: Please specify the date and time of the damage.
patron: Tuesday, Jan. 10, 2001.
S.I.A.S.: Please specify the exact location, including the nearest complete address, at which the damage occurred.
patron: On Broadway, block 500, Chicago, Ill. 45847
S.I.A.S.: Please specify the cause and nature of the damage.
patron: Side-to-side collision with a red vehicle, owned by a Mr. L. R. Sullivan.
S.I.A.S.: Please identify a phone number and time at which you can be reached within 24 hours.
patron: (215) 678-6457, at 6 p.m. Central Standard Time.

Using speech recognition technology, the patron's responses are transferred into a written format for review by a claims adjuster. Responses that could not be speech recognized are marked against the specific response and submitted for transcription. Furthermore, the speaker intent analysis system provides an assessment as to the credibility of the patron's responses. Preferably, this information is provided to the claims adjuster while the caller is still on the telephone, so the adjuster can ask or respond to additional questions, or provide requested information to the patron.

EXAMPLE 4

Public Transportation, Airplane—

As additional example, the speaker intent analysis system is used to support homeland security. To this end, travelers approaching an airplane first must communicate with the speaker intent analysis system. The speaker intent analysis system may be made available at a booth located inside the airport terminal. Alternatively, the traveler may be asked a series of questions when purchasing his ticket over the phone. Communication may proceed as follows:
S.I.A.S.: Please state your name and boarding number or social security number.
traveler: Jane Doe, 235-79-3646
S.I.A.S.: Please state the date and your departure city.
traveler: Jun. 15, 2002, Seattle, Washington.
S.I.A.S.: Are you carrying any illegal substances or weapons?
traveler: no
S.I.A.S.: Do you have any unlawful intent while traveling today?
traveler: no The first two questions are used by the speaker intent analysis system to calibrate the traveler's voice. They are also used to validate the person's records, and may be used to effect background checks as may be deemed necessary. Moreover, the initial responses may be used for voice print identification, though passwords may also be added. Thereafter, the responses to the final two questions are analyzed as to their credibility. An analysis suggesting lack of truthfulness or irritability or nervousness may be used to trigger a more thorough search of the traveler by security.

While the above description contains many specificities, the reader should not construe these as limitations on the scope of the invention, but merely as exemplifications of preferred embodiments thereof. Those skilled in the art will envision many other possible variations within its scope. Accordingly, the reader is requested to determine the scope of the invention by the appended claims and their legal equivalents, and not by the examples which have been given.

EXAMPLE 5

Sales Priority Assessment—

A mortgage lending institution has just run a series of advertisements about their new low interest loans. The call center is inundated with unusually large volumes of calls and cannot respond or answer every call with a live operator.
The process may proceed as follows:
S.I.A.S.: Please state your name
Potential customer: John Smith
S.I.A.S.: Please say your telephone number
Potential customer: 949-555-1234
S.I.A.S.: You said "949-555-1234", Is this correct?
Potential customer: Yes
S.I.A.S.: Will you be wanting to get your loan within the next 7 days?
Potential customer: Yes
S.I.A.S.: Are you interested in more information regarding our new home loan programs or would you like to apply for a loan?
Potential customer: I would like to apply for a loan Based on the responses given, and the speaker intent credibility analysis, the caller might be placed in a priority queue to speak to an agent sooner or notified that they will be called back within a short period of time (shorter than without the assessment). Or if the results determine that the person is really just window shopping, they will be scheduled for a callback, but will be assessed a lower priority. The goal is to make sure that the potential customers with the highest likelihood of actually applying for a loan are given attention first.

I claim:
1. A speaker intent analysis system comprising:
   a. a plurality of participant transceivers, said participant transceivers including a transmitter for transmitting audible answers and a receiver for receiving audible questions, and said participant transceivers including a camera for capturing a facial image of a participant;
   b. at least one "inquiry" transceiver including a transmitter for transmitting audible questions to said participant receivers and a receiver for receiving the audible answers to the questions and for receiving facial images from said camera;
   c. a communications network for connecting said participant transceivers to said inquiry transceiver; and
   d. a central voice and image processor connected to said communications network and said inquiry transceiver for receiving the audible answers from the questions and the images from said camera, said central voice processor including capabilities of voice analysis including analyzing speech parameters of the plurality of audible answers for producing determinations as to a participant's intent to deceive or not deceive when producing the audible answers, said central voice and image processor also including capabilities of facial image analysis for analyzing facial images from said camera for producing determinations as to a participant's intent to deceive or not deceive.
2. The speaker intent analysis system of claim 1 wherein said inquiry transceiver includes a computer processor for automatically transmitting said questions from an internal database.

3. The speaker intent analysis system of claim 1 wherein said facial image analysis further including analysis including facial recognition to determine the identity of a participant.

4. The speaker intent analysis system of claim 3 further comprising
   a. a list of persons; and
   b. alert means for producing an alert if a participant is identified as a person on said specified list.

5. A method for assessing speaker intent comprising the steps of:
   a. transmitting audible questions over a communications network to a plurality of participants at one time;
   b. receiving audible answers to the questions by a central processor;
   c. analyzing a plurality of participant audible answers by the central processor;
   d. obtaining a facial image of a participant;
   e. analyzing the facial image of a participant by the central processor; and
   f. producing a computer generated output reflecting a determination as to a participants' intent to deceive or not deceive based upon the participant's facial image and their audible answers.

6. The method for assessing speaker intent of claim 5 further comprising the step of:
   a. recognizing the identity of a participant using image recognition software.

7. The method for assessing speaker intent of claim 6 further comprising the steps of:
   a. providing a list of persons; and
   b. producing an alert if the participant is identified as a person on a specified list.

8. A speaker intent analysis system comprising:
   a. an inquiry transceiver including a first transmitter for transmitting audible questions to a plurality of participants to elicit a participants' audible answers and a first receiver for receiving the participants' audible answers;
   b. a plurality of participant transceivers each participant transceiver including a second receiver for receiving the participant's audible answers to the questions and a second transmitter for transmitting the participant's audible answers, said participant transceivers further including a camera for capturing a facial image of the participant;
   c. a communications network for connecting said participant transceivers to the inquiry transceiver;
   d. a database for containing questions; and
   e. a computer processor connected to said communications network and said database, said computer processor retrieving questions from the database based on information gained from earlier participant audible answers, transmitting audible questions to the first transmitter for transmission to participants, receiving the participant's audible answers from the first receiver, and analyzing the speech parameters of the audible answers for producing determinations as to a participant's intent to deceive or not deceive when producing the responses, said central processor also receiving and analyzing said participant facial images for producing a determination as to a participant's identity.

\* \* \* \* \*